(12) United States Patent
Camarillo

(10) Patent No.: US 8,746,156 B2
(45) Date of Patent: Jun. 10, 2014

(54) PORTABLE DESK APPARATUS AND METHODS

(76) Inventor: Richard J. Camarillo, San Diego, CA (US)

( * ) Notice: Subject to any disclaimer, the term of this patent is extended or adjusted under 35 U.S.C. 154(b) by 488 days.

(21) Appl. No.: 12/971,926

(22) Filed: Dec. 17, 2010

(65) Prior Publication Data

US 2011/0147560 A1 Jun. 23, 2011

Related U.S. Application Data

(60) Provisional application No. 61/287,629, filed on Dec. 17, 2009.

(51) Int. Cl.
*A47B 13/02* (2006.01)

(52) U.S. Cl.
USPC ............................................. 108/150; 108/6

(58) Field of Classification Search
USPC ................. 108/150, 156, 157.1, 157.15, 159, 108/158.11, 43, 6, 8, 11, 12; 248/127, 248/178.1, 179.1, 181.1, 181.2, 176.3
See application file for complete search history.

(56) References Cited

U.S. PATENT DOCUMENTS

| | | | | |
|---|---|---|---|---|
| 951,145 A * | 3/1910 | McGenniss | ........................ | 108/1 |
| 1,246,981 A * | 11/1917 | Moyer | .............................. | 108/8 |
| 1,501,005 A * | 7/1924 | Larsen | ........................ | 297/250.1 |
| 2,568,534 A | 9/1951 | Baker | | |
| 2,808,908 A * | 10/1957 | Lyon | ........................ | 188/264 R |
| 3,494,306 A * | 2/1970 | Aguilar | .............................. | 108/6 |
| 3,991,966 A | 11/1976 | Breer, II | | |
| 4,078,757 A * | 3/1978 | Waters | ........................ | 248/441.1 |
| 4,130,263 A * | 12/1978 | Roericht | ........................ | 248/371 |
| 4,441,432 A * | 4/1984 | Carlton | .............................. | 108/5 |
| 4,494,754 A | 1/1985 | Wagner, Jr. | | |
| D286,711 S * | 11/1986 | Roczey | ........................ | D6/406.4 |
| 5,362,025 A | 11/1994 | Trom et al. | | |
| 5,395,178 A * | 3/1995 | Chvojcsek | ........................ | 403/349 |
| 5,456,440 A * | 10/1995 | Sideris | ........................ | 248/458 |
| D364,757 S | 12/1995 | Jaeger | | |
| 5,732,910 A | 3/1998 | Martin | | |
| 6,006,970 A | 12/1999 | Piatt | | |
| 6,056,378 A * | 5/2000 | Semon et al. | ................. | 312/246 |
| 6,173,656 B1 | 1/2001 | Blanchard | | |
| 6,269,753 B1 | 8/2001 | Roddan | | |
| 6,305,532 B1 | 10/2001 | Overkamp | | |
| 6,748,873 B2 | 6/2004 | Brown, Sr. | | |
| 7,207,540 B2 | 4/2007 | Thomas | | |
| 7,252,040 B2 | 8/2007 | Dumond | | |
| 7,278,644 B2 | 10/2007 | Villarreal | | |
| 7,791,311 B2 | 9/2010 | Sagoo | | |
| 7,922,249 B2 | 4/2011 | Marchand | | |
| 2002/0078862 A1* | 6/2002 | Bieza | .............................. | 108/43 |
| 2002/0096091 A1* | 7/2002 | Cloud | .............................. | 108/43 |
| 2007/0028812 A1 | 2/2007 | Dumond | | |
| 2007/0145205 A1 | 6/2007 | Liang | | |
| 2007/0261608 A1* | 11/2007 | Hu | .............................. | 108/1 |
| 2008/0035029 A1 | 2/2008 | Adams | | |
| 2008/0163801 A1* | 7/2008 | Gamba et al. | ................. | 108/102 |
| 2008/0192424 A1 | 8/2008 | Lee | | |

\* cited by examiner

*Primary Examiner* — Janet M Wilkens
(74) *Attorney, Agent, or Firm* — Gazdzinski & Associates, PC

(57) ABSTRACT

Portable workstation or desk apparatus and methods. In one embodiment, a portable workstation is comprised of a plurality of components including a work surface or upper element, a stem or support element, and an anchor or base element. In one variant, the work surface element (and/or the base element) can be mounted to the stem element in first and second configurations. The various configurations provides a substantially level work surface (relative to the base) or a substantially inclined work surface, and/or varying degrees of offset relative to the base.

18 Claims, 14 Drawing Sheets

PORTABLE DESK APPARATUS AND METHODS

PRIORITY AND RELATED APPLICATIONS

This application claims priority to U.S. Provisional Patent Application Ser. No. 61/287,629 filed Dec. 17, 2009 and entitled "PORTABLE WORKSTATION", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to portable workstations or surfaces, and more particularly in one exemplary aspect to a collapsible portable desk for various uses such as reading or supporting a computerized device.

2. Description of Related Technology

Flexibility in modern day travel enables those who desire to travel vast distances in a short amount of time. For example, it is not unusual for a business person to travel from one continent to another in a matter of one or two days solely to effectuate a business transaction with a manufacturer or distributor. Advances in the portability of electronic devices allows travelers to bring a wide array of such devices (e.g., laptop computers, portable DVD players, cellular phones, tablet readers, etc.) when traveling. Even those traveling short distances may have a need to bring a particular portable electronic device for business purposes or for pleasure. A traveler may choose to use a particular portable device in a variety of different venues, e.g., in a car, train, airplane, airport, etc.

One challenge in using portable electronic devices while in transit can be situating it in a feasible and/or comfortable position for use by the traveler. With respect to at least a laptop computer, other challenges can relate to dissipation of the heat generated by the computer (which can be appreciable due to, e.g., the large batteries carried in many laptops and the computer's comparatively small dimensions and lack of airflow), weight of the computer, and balancing the computer on the user's legs or other body parts.

Moreover, indigenous mechanisms for supporting a user's computer, papers, etc. are often cramped and not optimized. For instance, the well known fold-down seatback trays used commonly in commercial aircraft are often limited to a flat (horizontal) position, and typically are not ergonomically positioned so that extended use is uncomfortable for the passenger.

Another need is to have a stable, comfortable, and portable work surface while waiting for extended periods during travel (e.g., for boarding of a plane or train, etc.). Most airports and train terminals have limited workspace, especially for example at airline gates. This causes users wishing to access their electronic device to dispose it on their lap or hold it in their hands, which is not conducive to productive or extended use.

SUMMARY OF THE INVENTION

The present invention addresses the foregoing needs by providing, inter alia, apparatus and methods for providing a portable work surface.

In a first aspect of the invention, support apparatus is disclosed. In one embodiment, the support apparatus comprises: a substantially planar base element; a substantially planar upper element; and a support element coupled to the base element and the upper element. The base element and the upper element can be coupled to the support element in a plurality of different configurations so that the support apparatus is optimized for respective ones of a plurality of use applications.

In one variant, the upper, base and support elements are each fashioned at least partly from plastic, and the upper and base elements are each configured to mate with the support element in at least two different orientations.

In another variant, the a plurality of different configurations comprise (i) the upper element being substantially parallel to the base, and (ii) the upper element being angled with respect to the base.

In a further variant, the wherein the upper, base and support elements are each fashioned at least partly from plastic, and can be disassembled and placed in a disposition which allows the support apparatus to be substantially received in a single item of personal luggage.

In yet another variant, the plurality of different configurations comprise (i) a first configuration where an area of the upper element is substantially aligned with an area of the base element; and (ii) a second configuration where the area of the upper element is at least partly offset from the area of the base element.

In another variant, the base element is configured to receive the support element in a substantially central portion of the base element so that the support element can be received between two legs of a human being, and the base element will simultaneously engage the bottoms of the legs so as to stabilize the support apparatus.

In a second aspect of the invention, a method of configuring a support apparatus is disclosed. In one embodiment, the apparatus has top, support and base elements which may be assembled in a plurality of different configurations, and the method comprises: identifying a desired use case; assembling the top element to the support element in one of a plurality of possible discrete orientations thereof so as to be compatible with the use case; and assembling the support element to the base element in one of a plurality of possible discrete orientations thereof so as to be compatible with the use case.

In one variant of the method, the desired use case is for a laptop computer; the top element and the base element are each substantially planar; and the ones of a plurality of possible discrete orientations cooperate so as to place planes of the top element and the base element in a substantially parallel orientation with one another, yet with the top element offset in area from the base element.

In another variant, the desired use case is for the support apparatus to act as a podium or stand; and the ones of a plurality of possible orientations cooperate so as to permit the support apparatus to stand on its own on a flat surface under the weight of an object placed atop the top surface.

In a third aspect of the invention, reconfigurable portable workstation apparatus having a plurality of different assembled configurations is disclosed. In one embodiment, the apparatus comprises: a base element having an interface surface comprising a first angle; an upper element having an interface surface comprising a second angle; and a support element operative to be coupled to the base element in a first plurality of different orientations, and to the upper element in a second plurality of different orientations, the first and second pluralities of different orientations and the first and second angles cooperating to produce the plurality of different assembled configurations.

In one variant, the first and second angles are not equal.

In another variant, the first and second pluralities of different orientations each comprise first and second orientations which are substantially reversed from one another.

In a fourth aspect of the invention, a portable workstation is disclosed. In one embodiment, the workstation comprises: a work surface, the work surface approximately rectangular; an anchor plate, the anchor plate approximately rectangular, the anchor plate having at least two contoured areas on an upper surface; and a stem connecting to the anchor plate at a proximal end and connecting to the work surface at a distal end.

In one variant, the stem connects to the work surface midway between a left edge of the work surface and a right edge of the work surface.

In another variant, the stem connects to the anchor plate midway between a left edge of the anchor plate and a right edge of the anchor plate.

In yet another variant, the stem connects near a front edge of the work surface and connects near a back edge of the anchor plate.

In a further variant, the anchor plate is smaller than the work surface.

In other variants, a locking mechanism secures the proximal and/or distal ends of the stem to the anchor plate when assembled.

In still another variant, the portable workstation further comprises an extendible piece slidably engaged with one or more rails on a bottom surface of the work surface.

In another variant, a space between the work surface and anchor plate is sized to fit a user's legs therebetween.

In a further variant, the stem is sized to fit between a user's legs while the anchor plate rests on a sitting surface.

In a fifth aspect of the invention, portable support apparatus is disclosed. In one embodiment, the apparatus comprises: a base element; and a substantially vertical support element comprising a first end and a second end, the first end coupling to the base element, and the second end comprising an interface adapted for removable mating with a complementary interface on an electronic device. The base, support element and interface of the second end cooperating to substantially rigidly support the electronic device when in use.

In a sixth aspect of the invention, a portable child seat apparatus is disclosed.

In a seventh aspect of the invention, a collapsible portable workstation is disclosed.

In an eighth aspect of the invention, methods of using a portable support apparatus are disclosed.

Further features of the present invention, its nature and various advantages will be more apparent from the accompanying drawings and the following detailed description.

BRIEF DESCRIPTION OF THE DRAWINGS

The features, objectives, and advantages of the invention will become more apparent from the detailed description set forth below when taken in conjunction with the drawings, wherein.

Figure 1A:
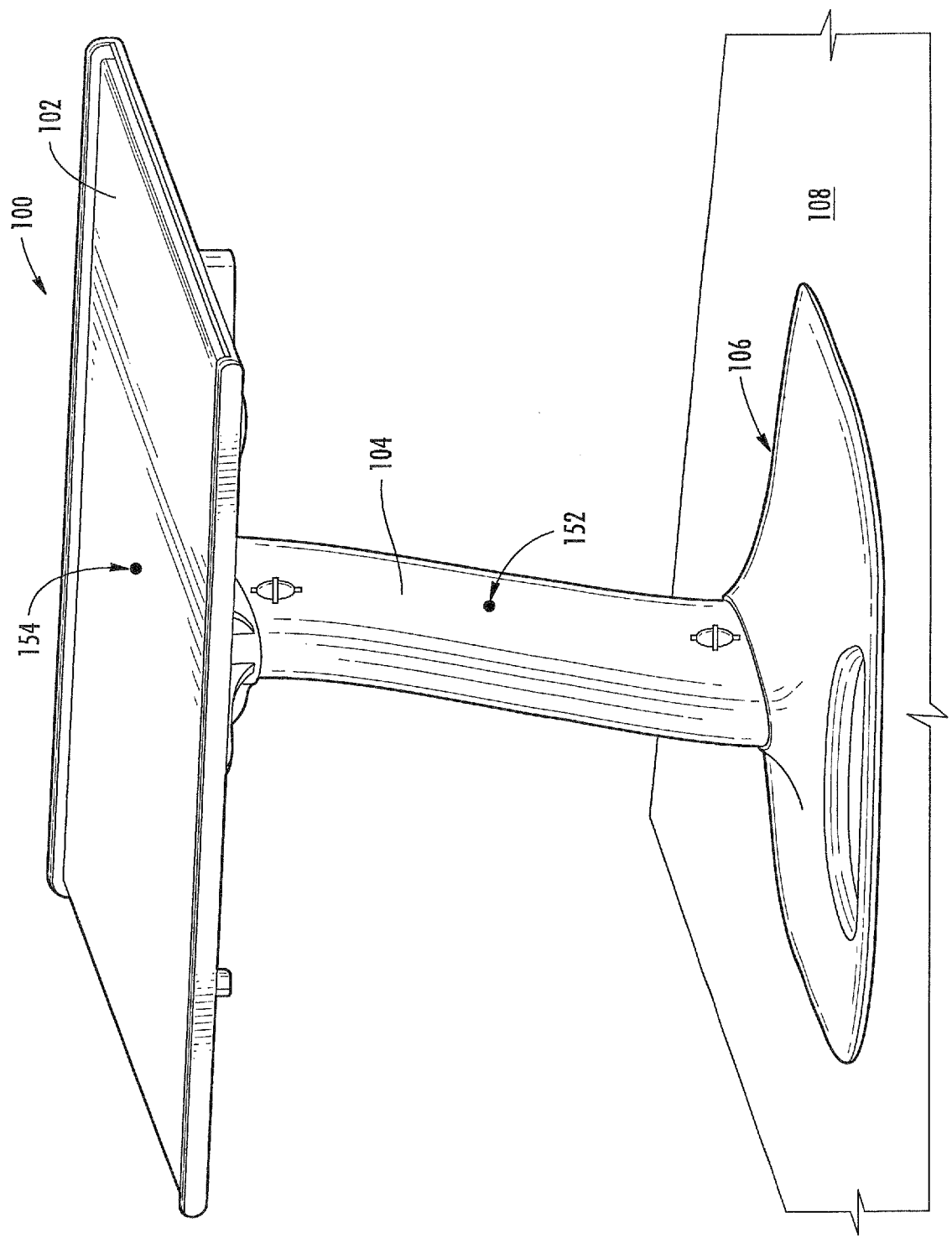
FIG. 1A is a perspective view of a portable workstation in an assembled configuration according to an embodiment of the invention.

All Figures © Copyright 2009-2010 Caazorii Inc. All rights reserved.

DETAILED DESCRIPTION OF THE INVENTION

Reference is now made to the drawings wherein like numbers refer to like parts throughout.

Overview

Exemplary embodiments of the invention are directed to portable workstations for use as a working surface in various environments. In one embodiment, a portable workstation is comprised of a plurality of components including a work surface or upper element, a stem or support element, and an anchor or base element which cooperate to form a support structure. The work surface may be flat or substantially flat, and may or may not be expandable/adjustable. The stem may be angled or partially angled, and may or may not be extendible/adjustable. The anchor or base element may be planar, and/or contoured on at least one surface in order to accommodate the physical features of a user.

In one exemplary variant, the work surface element can be mounted to the stem element in first and second configurations. The first configuration provides a substantially level work surface (relative to the base), and the second configuration provides a substantially inclined work surface relative to the base.

In another variant, the anchor component can be mounted to the stem component in first and second configurations; the first configuration provides a work surface substantially offset from the anchor or base component, and the second configuration provides a work surface centered over the anchor component.

In another variant, the upper element is configured to receive other types of electronic devices such as tablet computers or readers (e.g., Kindles™, IPads™), smartphones, etc., whether alone or in conjunction with the aforementioned upper work surface.

As described in greater detail herein, various embodiments of the present invention are further configured for ease of assembly, disassembly, and stowage of the apparatus by a user. For example, the components can be assembled as a utility configuration, or assembled into a stowage configuration. The utility configuration generally embodies configurations where the work surface is connected to the stem element (via a proximal end of the stem element), and the stem element is connected to the anchor or base element (via a distal end of the stem) so as to support a book, computer, device, etc. The stowage configuration generally includes configurations where the work surface is disposed proximate to both the stem and base elements in a space-saving orientation so that, e.g., it can be received within a personal luggage item such as a laptop computer carrying case or carry-on bag.

In another embodiment, the apparatus is configured to act as a child seating surface.

In still another embodiment, the apparatus includes a base element and a stem or support element, the latter which is configured to interface directly with an electronic device or non-electronic device.

Yet other combinations and permutations of a portable workstation are described in greater detail hereinafter.

Advantages of the exemplary embodiments disclosed herein include, inter alia, (i) support of varying size objects and devices; (ii) inherent stabilization via the user's legs and body weight; (iii) ability to be used on hard or soft seating surfaces; (iv) relief of tension resulting from holding up or stabilizing objects (e.g., books, computers, etc.); and (v) reduced user neck strain by virtue of properly elevated object or device which the user is viewing.

Apparatus—

Referring now to FIGS. 1A-1D, various components of one embodiment of a generalized portable workstation apparatus 100 are illustrated. As shown, in this embodiment, the portable workstation apparatus 100 comprises a work surface or upper element 102, a stem or support element 104, and an anchor or base element 106. In certain embodiments, an extendible piece may be slidably engaged with one or more rails on a bottom surface of the work surface. Also illustrated are reference elements useful for subsequent discussion; the reference elements include a reference plane 108 which is flush with the face of the anchor element, a first centroid 152 of the stem, and a second centroid 154 of the work surface. Ones having ordinary skill in the related arts will recognize that the reference elements may or may not correspond to a physical structure of the apparatus, their use herein being purely illustrative.

Furthermore, in the following descriptions of the relevant figures, the "proximal end" and "distal end" of the stem 104 are made in reference to the anchor or base element 106, although it will be recognized that these designations are for sake of convenience in illustration only, and in no way are limiting to the scope of the inventions claimed herein.

During normal use (i.e., utility configuration), the user sits on the top surface of the anchor or base element 106 with the stem element 104 between the user's legs, and the work surface 102 in front of the user. Accordingly, the terms "right", "left", "front" and "back" are made in reference or relative to the user's orientation during a typical use scenario, yet are in no way intended to limit the possible orientations in which the apparatus may be used. For example: (i) the term "right edge of the work surface" refers to the edge to the right of the user, (ii) the term "left edge of the work surface" refers to the edge to the left of the user, (iii) the term "front edge of the work surface" refers to the edge closest to the user, and (iv) the term "back edge of the work surface" refers to the edge farthest from the user.

In one variant of the embodiment of FIG. 1A, the stem or support 104 may be reversibly connected to a top surface of the anchor plate 106 at a proximal end, and reversibly connected to a bottom surface of the work surface 102 at a distal end As used herein, the terms "reverse", "reversed", "reversible" and "reversibly" relate to the components having a first connective configuration, and at least a second connective configuration where the second configuration is substantially opposite the first configuration. It is readily appreciated that yet other variants of the present invention may provide other dispositions or degrees of position, the foregoing being merely illustrative. More detailed discussion of one reversible configuration of the apparatus according to the invention is provided herein below.

As shown, the point of connection of the stem 104 (at the distal end) to the work surface 102 may be approximately centered relative to a left edge and a right edge of the work surface 102. Additionally, the stem 104 (at distal end) may connect near or substantially near to a front edge of the work surface (as opposed to a back edge). Similarly, the point of connection of the stem 104 (at proximal end) to the anchor element 106 may be approximately centered relative to a left edge and a right edge of the anchor element 106. Additionally, the stem 104 (at proximal end) may connect near or substantially near to a back edge (as opposed to a front edge).

In one exemplary embodiment, the top surface of the work surface 102 may be flat or substantially flat. In one implementation, the work surface 102 may be between about twenty-four (24) inches in width and about twelve (12) inches in length, or about twelve (12) inches in width and about nine (9) inches in length, although it will be appreciated that other dimensions may be used if desired.

In one embodiment, the work surface 102 includes one or more extendable surface pieces (not shown to increase the area of the working surface. The extendable surface piece(s) may for example slide out linearly, be hinged to fold out, or be articulated in any number of other different ways readily envisaged by those of ordinary skill given the present disclosure.

In other embodiments, various depressions or raised relief elements may be added. For example, one or more relief "lips" or ledges may protrude from the surface to prevent items from slipping off the work surface. Similarly, in other variants, the work surface may include a depression e.g., to secure a cup, writing instrument, utensil, etc.

In one embodiment, the top surface of the anchor element 106 is contoured in one or more areas; e.g., in a left area and a right area. The contoured left and right areas may accommodate, e.g., the backside of a user's left and right legs, respectively (explained in more detail below). In one exemplary variant, the anchor element 106 is between about twelve (12) inches in width and about ten (10) inches in length, or in another variant about eleven (11) inches in width and about seven (7) inches in length.

The stem 104 is in one variant approximately perpendicularly oriented relative to the work surface 102 and the anchor element 106. In one implementation, the stem 104 angles in an outward direction from the proximal end to the distal end. That is, when a user positions the portable workstation 100 under and between the user's legs, the work surface 102 projects outwardly relative to the user. This is accomplished by the connection configuration of the stem 104 to the work surface 102 and the anchor element 106 as previously explained. In one variant, the stem 104 may be between about twelve (12) inches in height and about eight (8) inches in length. In another embodiment, the stem 104 may be about eight and one half (8.5) inches in height and about five and one-half (5.5) inches in length.

In one embodiment, the components 102, 104, 106 are formed from an injection molded plastic. Plastic has the benefits of generally low cost, light weight, and high strength, although other materials such as wood, cardboard, metal or any other suitable material and/or composite, may be used in place of or in conjunction with the plastic of the illustrated embodiment if desired or dictated by the application.

Yet other configurations are discussed in greater detail hereinafter (see discussion of Reversible Configurations).

Figure 1B:
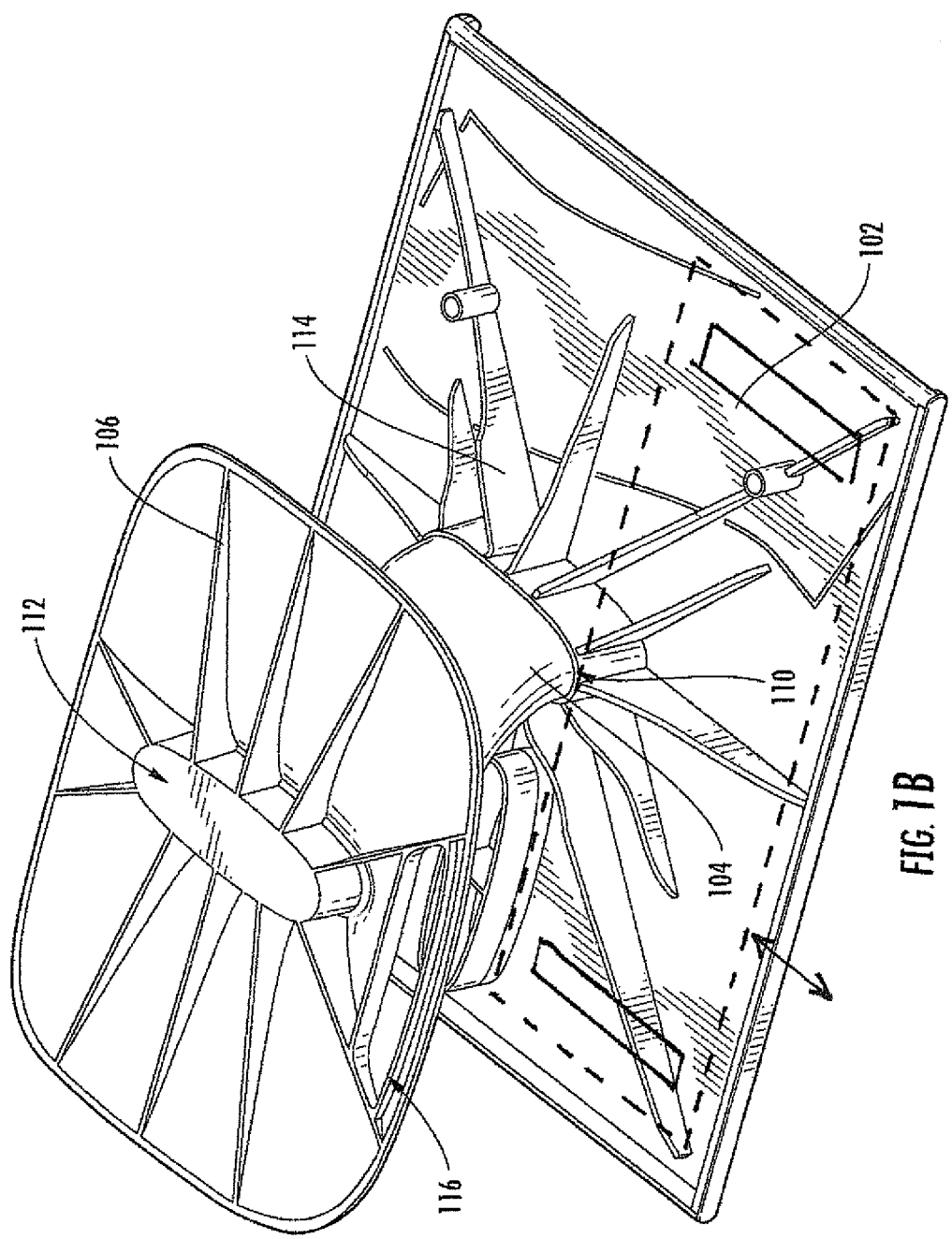
FIG. 1B is a perspective bottom view of the portable workstation of FIG. 1A.

FIG. 1B is a perspective bottom view of the portable workstation 100 of FIG. 1A. As shown, the distal end of the stem slidably engages with a receiving portion 110 on a bottom surface of the work surface 102; however, other connecting mechanisms such as e.g., friction insertion fits, cam pins, fasteners such as crews, snap fits, hinges, selectively releasable adhesives, etc. are envisaged and considered within the scope of the invention. Similarly, the proximal end of the stem 104 slidably engages with a receiving portion 112 (bottom surface shown) on a top surface (not shown) of the anchor element 106; however, other connecting mechanisms are within the scope of the invention for this application as well.

The connecting mechanism as shown advantageously allows for easy assembly and disassembly of the portable workstation 100 by a user. As shown, bottom surfaces of the work surface 102 and the anchor element 106 include a plurality of reinforcing ribs 114 radiating from the receiving portions 110, 112 and terminating at the edges of the work surface 102 and the edges of the anchor element, respectively. These ribs allow for, inter alia, appreciable strength of these components with reduced weight. In one embodiment, the anchor element 106 defines an opening 116 adjacent or substantially adjacent to the front edge of the anchor element 106. The opening 116 may function for example as a handle for a user when transporting the portable workstation 100 in a disassembled configuration.

Figure 1C:
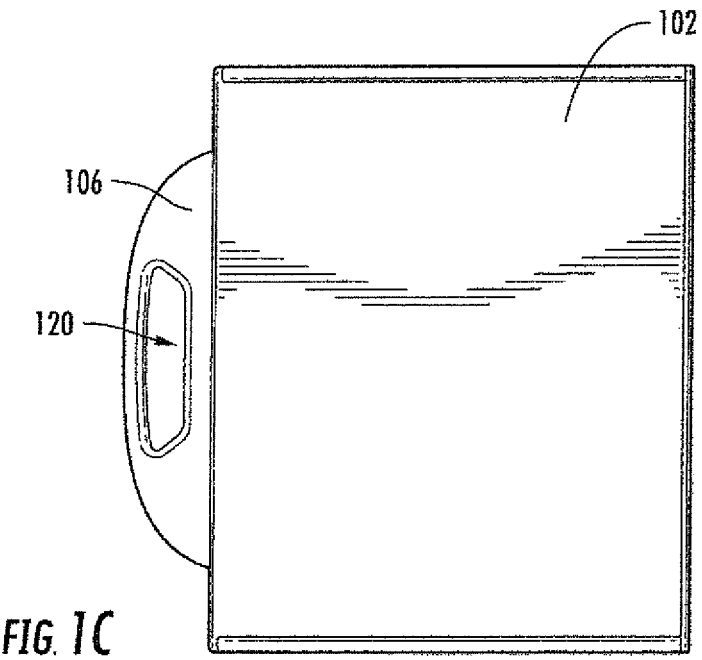
FIG. 1C is a top view of the portable workstation of FIG. 1A.

FIG. 1C is a top view of the portable workstation 100 of FIG. 1A. As shown, the work surface 102 may be offset from the anchor element 106 as illustrated herein. Such offset between the edges of the work surface 102 and anchor element 106 is also visible in FIG. 1D.

Figure 1D:
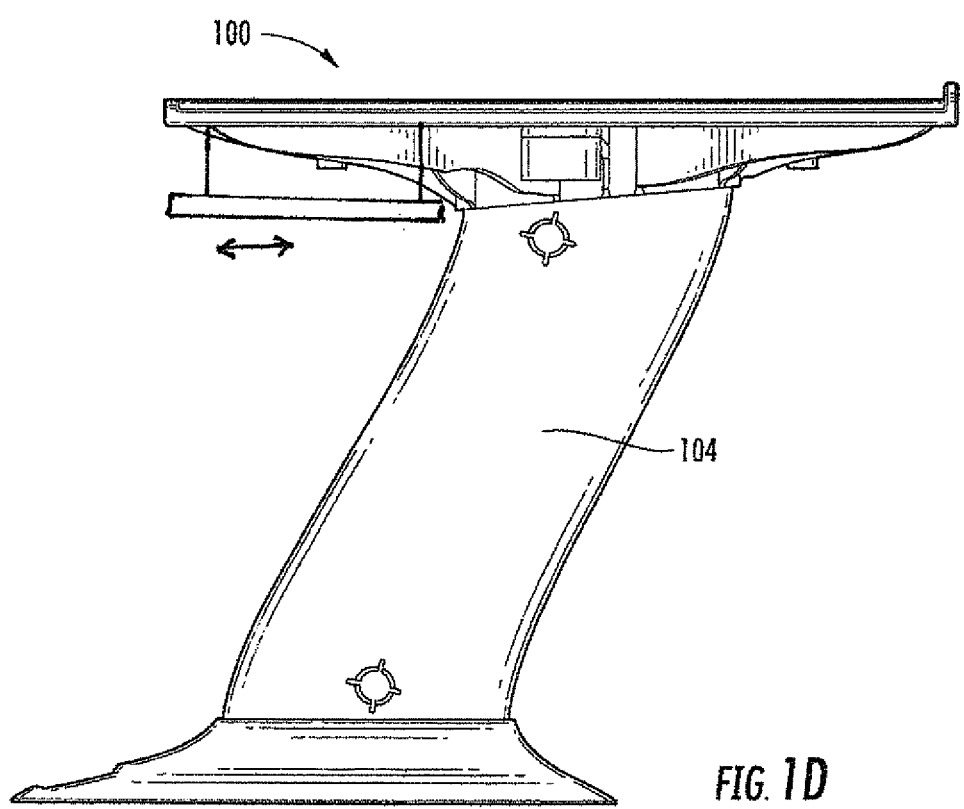
FIG. 1D is a side view of the portable workstation of FIG. 1A.

FIG. 1D is a side view of the portable workstation 100 of FIG. 1A. The angled nature of the stem element 104 of this embodiment is more clearly illustrated in FIG. 1D. Additionally, in the embodiment shown, the proximal and distal ends each include a locking mechanism 122 which functions to lock the stem 104 into place when connected to the work surface 102 and the anchor element 106, respectively. The locking mechanism may be, for example, a push-button locking mechanism, friction fit, cam pins, screws or any other suitable locking mechanism known by one of ordinary skill in the art. In some embodiments, the stem 104 includes two or more telescoping members to allow the stem 104 to adjust to a preferred height. Alternatively, a slidable, ratcheted, or other height adjustment mechanism (not shown) can be used to provide for variations of height.

Figure 1E:
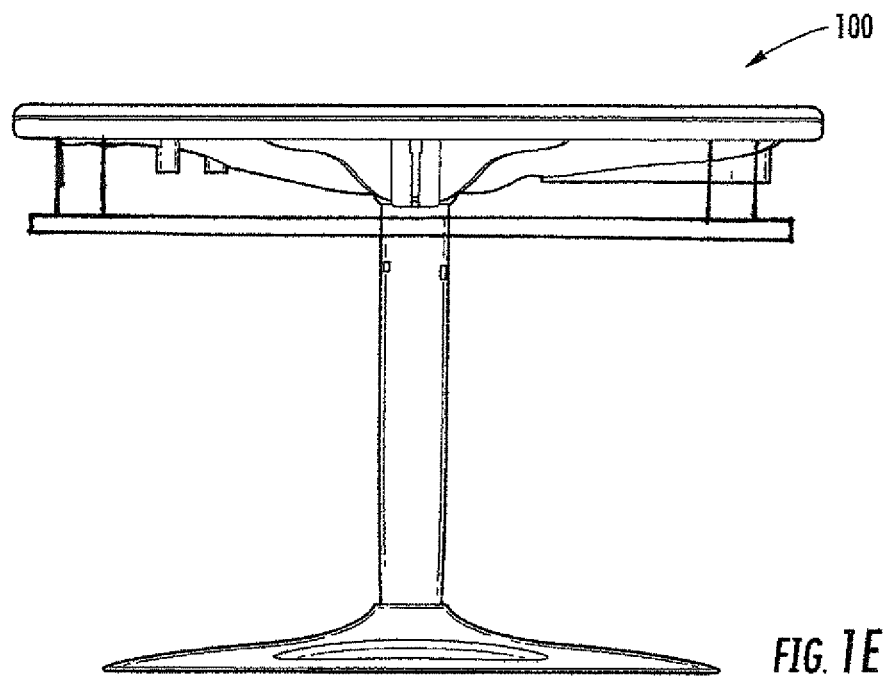
FIG. 1E is a front view of the portable workstation of FIG. 1A.

FIG. 1E is a front view of the portable workstation 100 of FIG. 1A.

Reversible Configurations—

According to another aspect of the present invention, components of the apparatus are optionally fashioned so that they can be assembled in multiple configurations to enable more versatile use scenarios. As described briefly supra, the various connections or couplings between the work surface or upper element 102, stem or support 104, and anchor element 106 are in one embodiment capable of reversible mounting or assembly.

Specifically, in one exemplary implementation, the mounting of the stem 104 to the anchor element 106 is such that the stem can be mounted to the anchor in either the normal configuration (angled away from the user), or the 180-degree reversed configuration (angled toward the user). Similarly, the mounting of the work surface 102 to the stem can be performed in either the normal configuration (in which the work surface 102 is substantially level with reference to reference plane 108), or in the reversed configuration (which produces a significant canting or angle of the work surface with respect to the reference plane 108). The canted and level configurations are made possible in the illustrated embodiment by use of a canted (angled) connective point as well as the shape of the stem itself. These features cooperate to provide a plurality of different, discrete (aka non-adjustable in the context of this embodiment) assembled configurations providing different angular relationships and/or offsets.

Figure 2A:
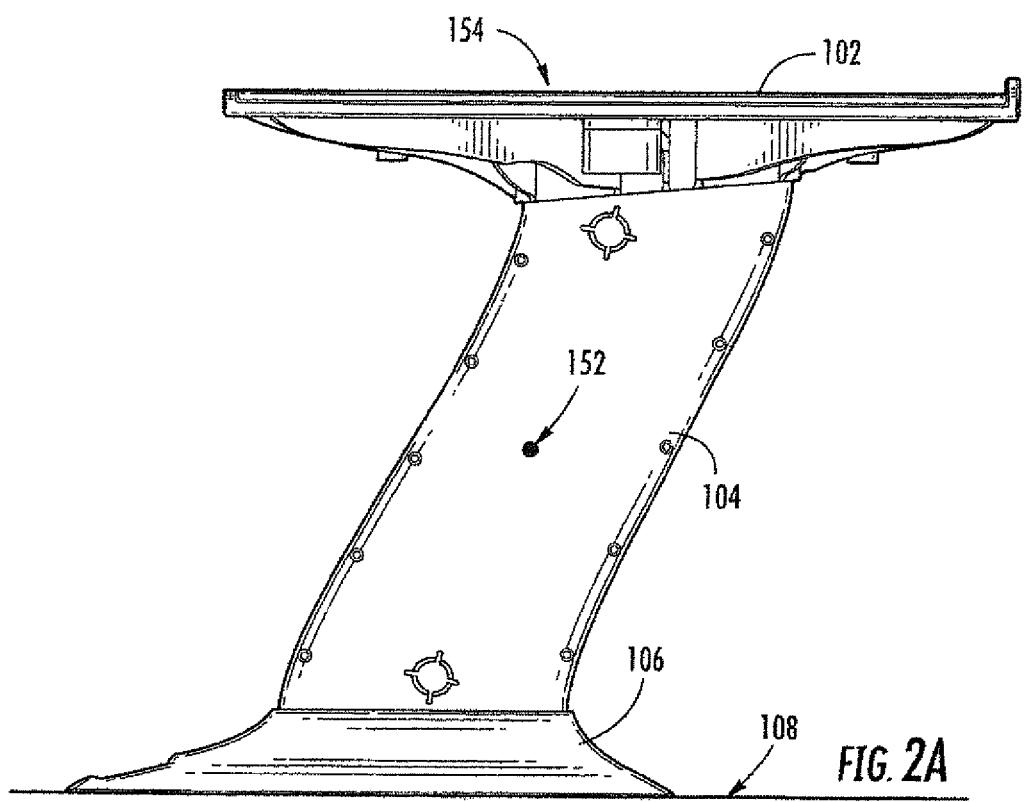
FIG. 2A is a side view of an embodiment of the portable workstation, assembled in a "desk configuration".

FIG. 2A is a side view of another embodiment of the portable workstation, assembled in a "desk configuration". In this configuration, the work surface is substantially level with respect to the reference plane 108, and the work surface is at a comfortable distance away from the user. Furthermore, note that the first centroid 152 of the stem is substantially offset from the second centroid 154, and overhanging the anchor element 106. The resulting combined center of gravity requires the user's body weight to hold the work surface in a stable position when bearing any appreciable amount of weight. In alternate embodiments, the anchor element (e.g., front portion) may be extended or elongated outward to provide additional stability.

Figure 2B:
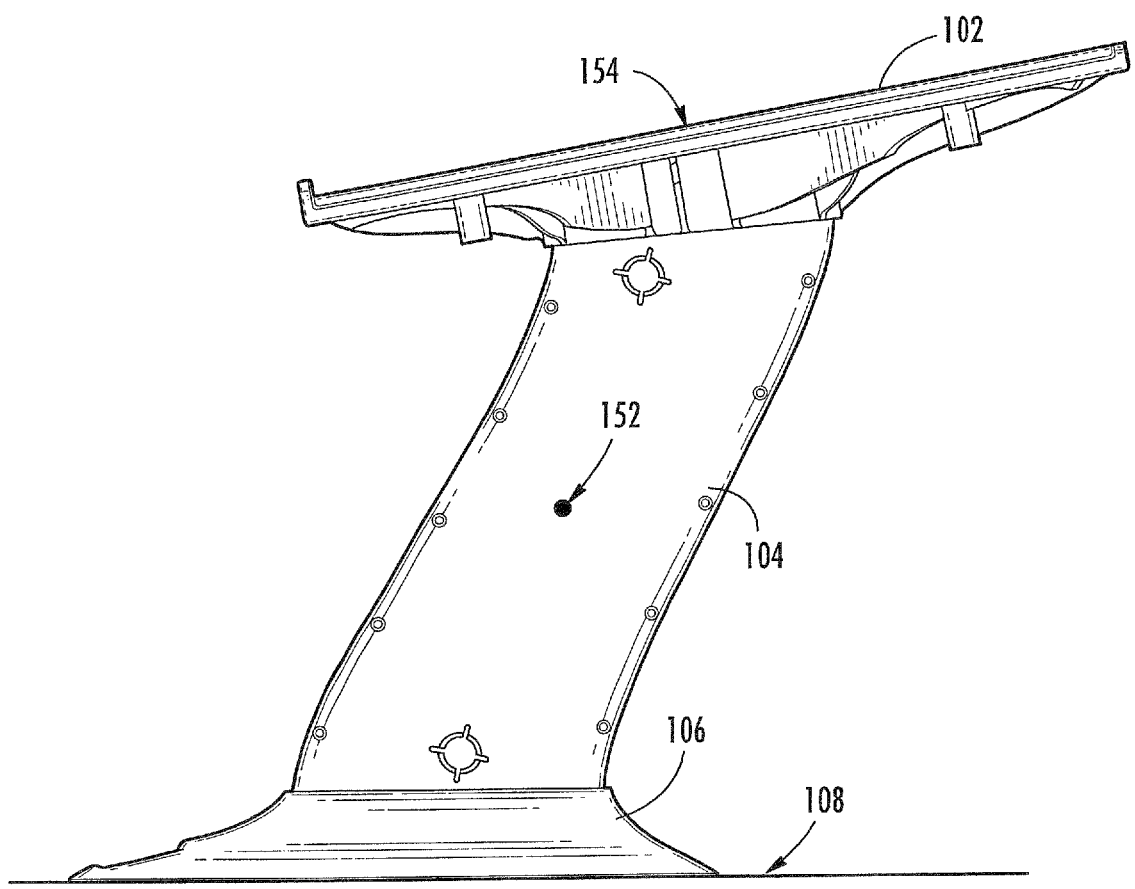
FIG. 2B is a side view of an embodiment of the portable workstation, assembled in an "angled work surface configuration".
Figure 2C:
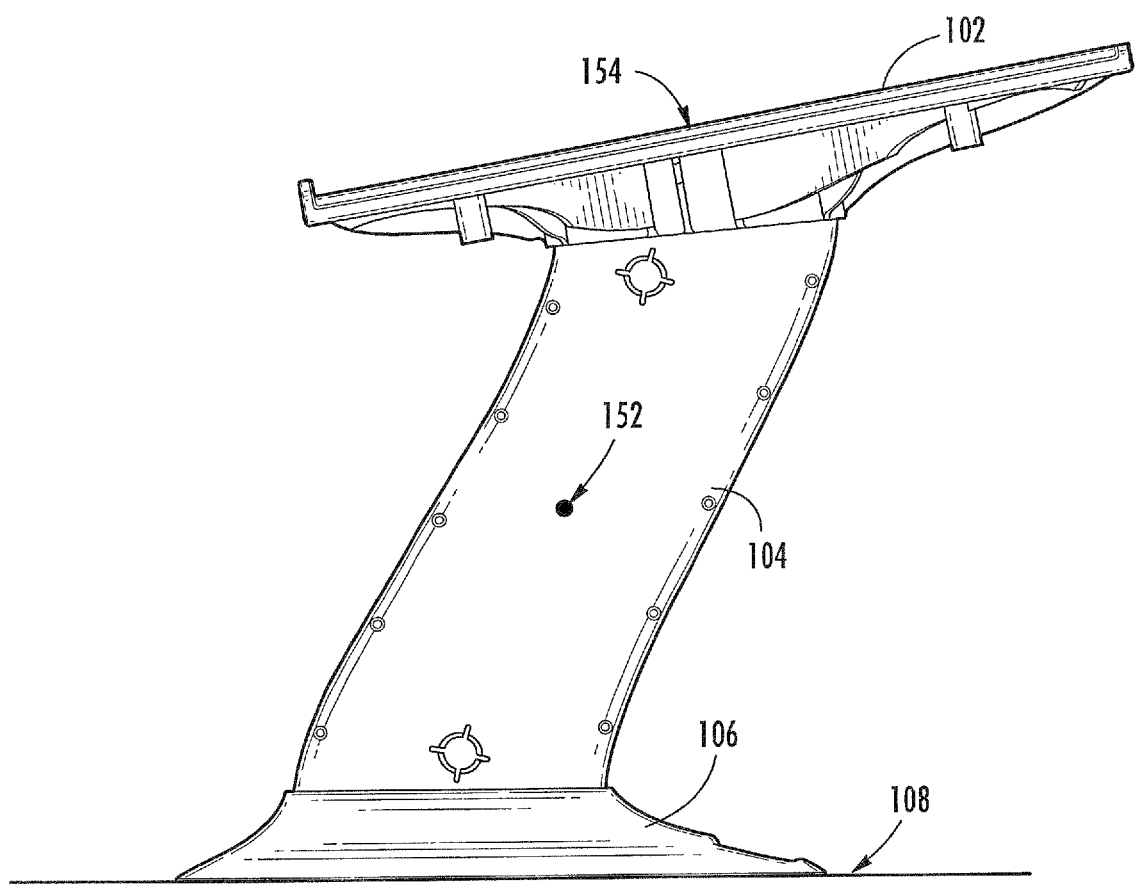
FIG. 2C is a side view of an embodiment of the portable workstation, assembled in a "book stand configuration".

FIG. 2B is a side view of the portable workstation of FIG. 2A, assembled in an "angled work surface configuration". In this configuration, the work surface is substantially inclined with respect to the reference plane 108, and the work surface is at a comfortable distance away from the user. In one embodiment, the work surface has an incline of approximately 10 (ten) degrees relative to the plane of the anchor element, although other angles may be used. Some variants may additionally include a relief, ledge or depression for preventing items from slipping off of the work surface as previously described FIG. 2C is a side view of the portable workstation of FIG. 2A, assembled in a "book stand configuration". In this configuration, the work surface is substantially inclined with respect to the reference plane 108. The stem 104 has additionally been reversed as compared to the configurations of FIGS. 2A and 2B, thereby bringing both first and second centroids (152, 154) over the anchor element 106. The resulting configuration has a center of gravity which enables the work surface to balance and support weight without the user's body weight, and which brings the work surface (and hence items placed thereon, such as a book) closer to the user and more inclined for easier reading and/or viewing (e.g., of a video rendering device such as a laptop computer screen).

Figure 2D:
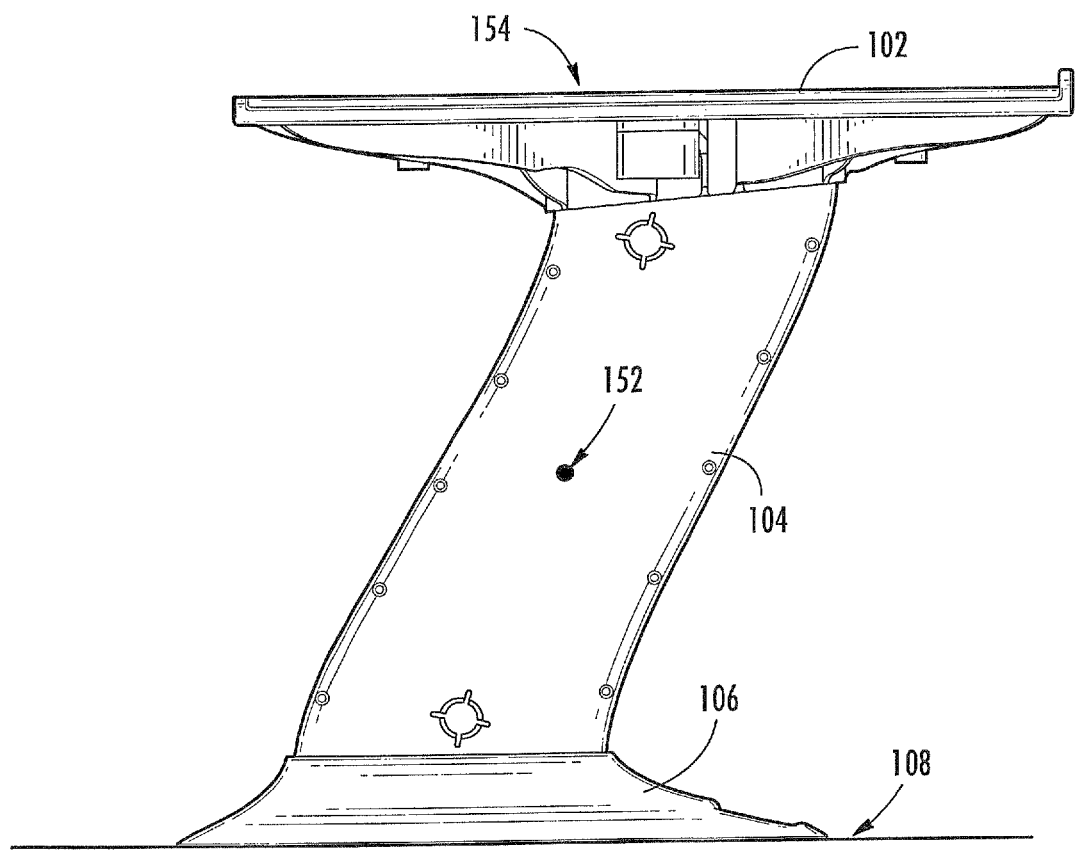
FIG. 2D is a side view of an embodiment of the portable workstation, assembled in a "podium configuration.
Figure 2E:
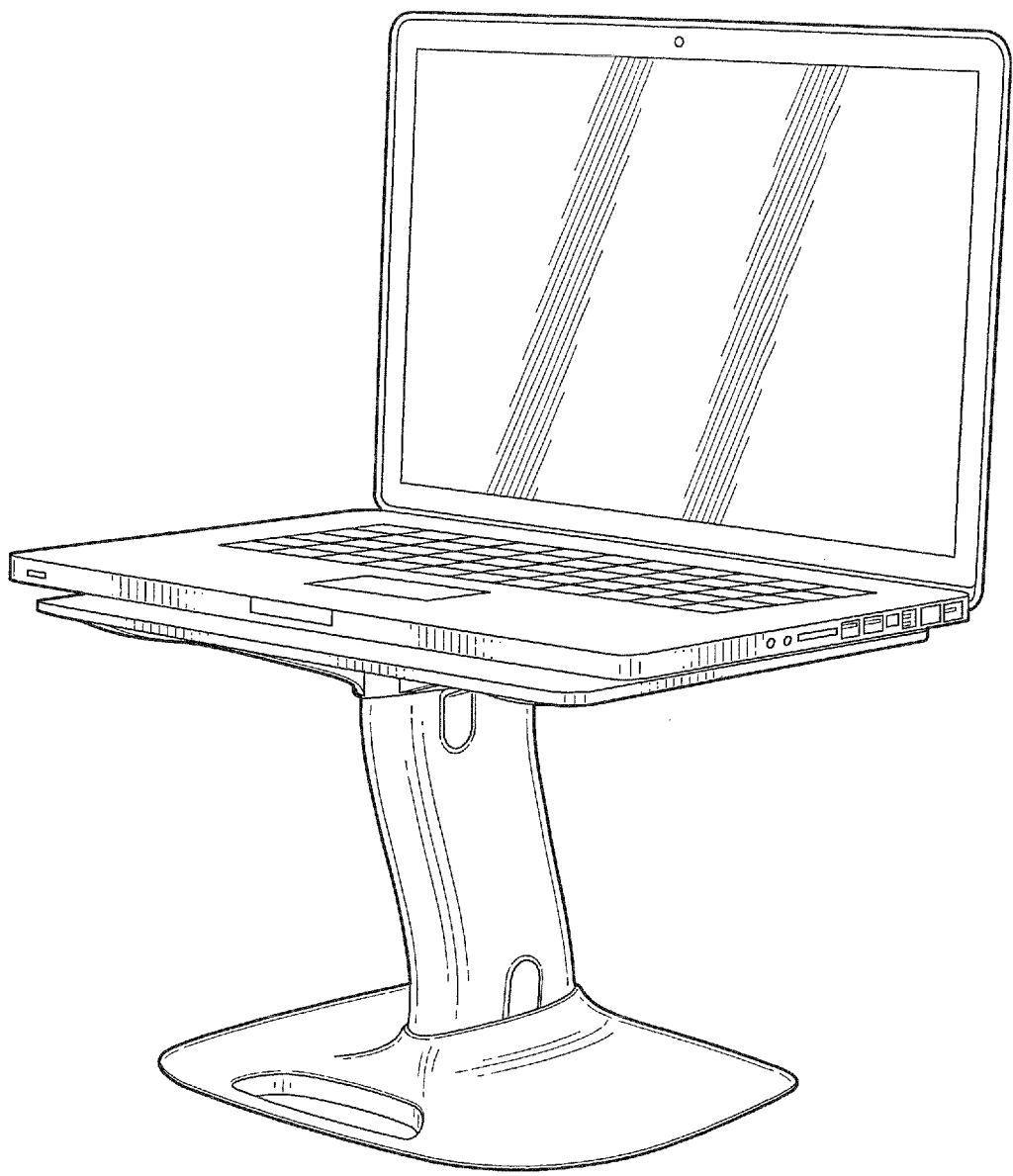
FIGS. 2E-2H illustrate various views and features of actual prototype implementations of various embodiments of the portable workstation according to the invention.
Figure 2F:
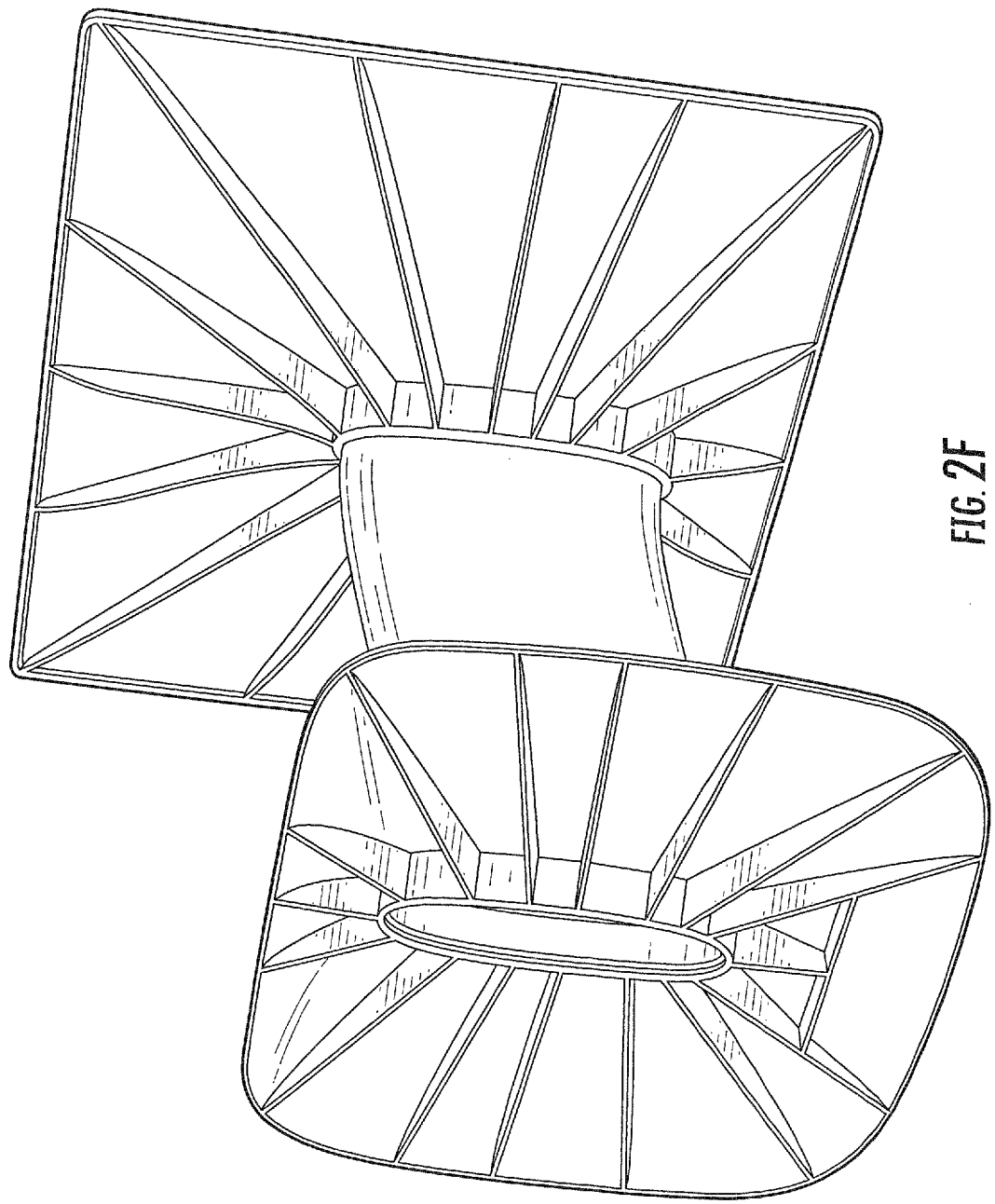
Figure 2G:
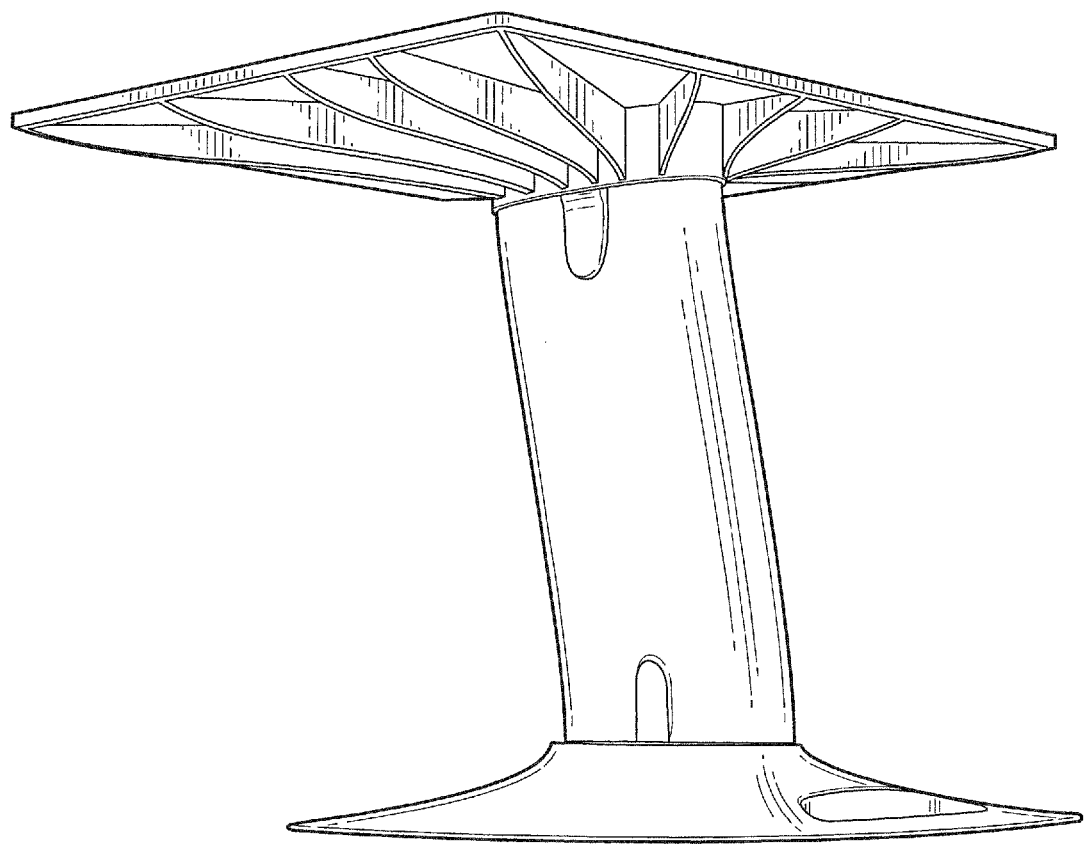
Figure 2H:
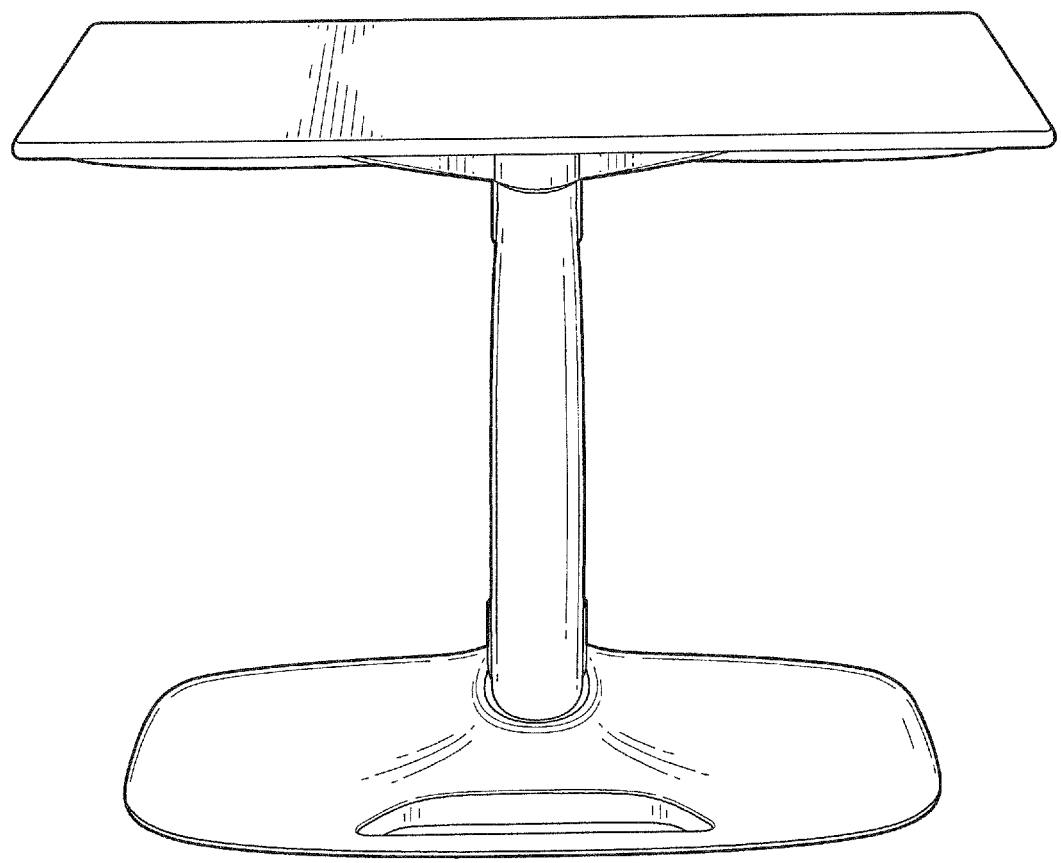

FIG. 2D is a side view of the portable workstation of FIG. 2A, assembled in a "podium configuration". In this configuration, the work surface is substantially level with respect to the reference plane 108. The stem 104 has been reversed to balance and support weight without the user's body weight.

It will be appreciated that various of the components 102, 104, 106 may also be substituted with those having other physical dimensions and/or angles, so as to enable the user to "mix and match" to achieve the desired orientation. For instance, one business model associated with the invention involves the sale or provision of substitute, user- or application-specific components that the user can insert into their apparatus in order to better optimize it for (i) their particular physical attributes, (ii) the intended use (e.g., cramped airliner seating versus more expansive train seating), and/or (iii) the type of work or electronic device to be performed on/at the workstation (e.g., laptop, tablet reader, paper book, etc.). Hence, the user can for example simply remove a work surface 102 having first dimensions/mounting angle/ancillary features, and replace it with another more suited to their particular needs at that time. Likewise, stems and/or base elements having varying attributes or configurations can be substituted if desired.

FIGS. 2E-2H illustrate various views and features of actual prototype implementations of various embodiments of the portable workstation according to the invention.

Stowage Configuration—

According to another aspect of the invention, the work surface 102 and anchor element 106 may be configured so as to be readily removable from the stem 104 for ease of storage and/or transportation of the portable workstation 100. The components, once disassembled, can be stowed independently, or in one variant fitted together (e.g., via purposely formed recesses, etc.) so that the base, stem and upper element form a spatially compact "package" without necessarily being assembled for use. This package can then be disposed e.g., in a laptop computer bag, item of personal luggage, etc.

Alternatively, the work surface 102 and anchor element 106 may be pivotally attached to the stem 104 so that they fold against the same or opposite longitudinal sides of the stem 104 for ease of storage and/or transportation of the portable workstation 100.

Figure 3A:
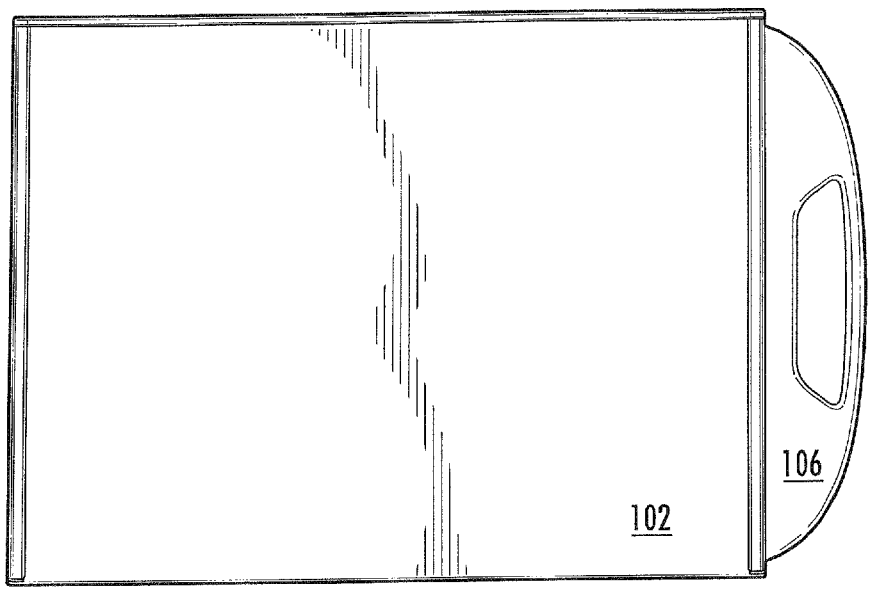
FIGS. 3A-3C are top, side, and bottom elevation views illustrating one exemplary stowage configuration for the workstation apparatus.
Figure 3B:
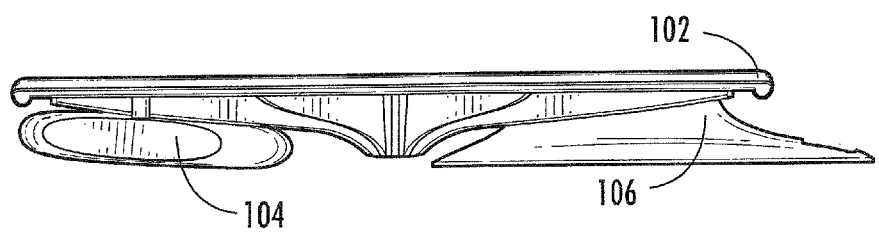
Figure 3C:
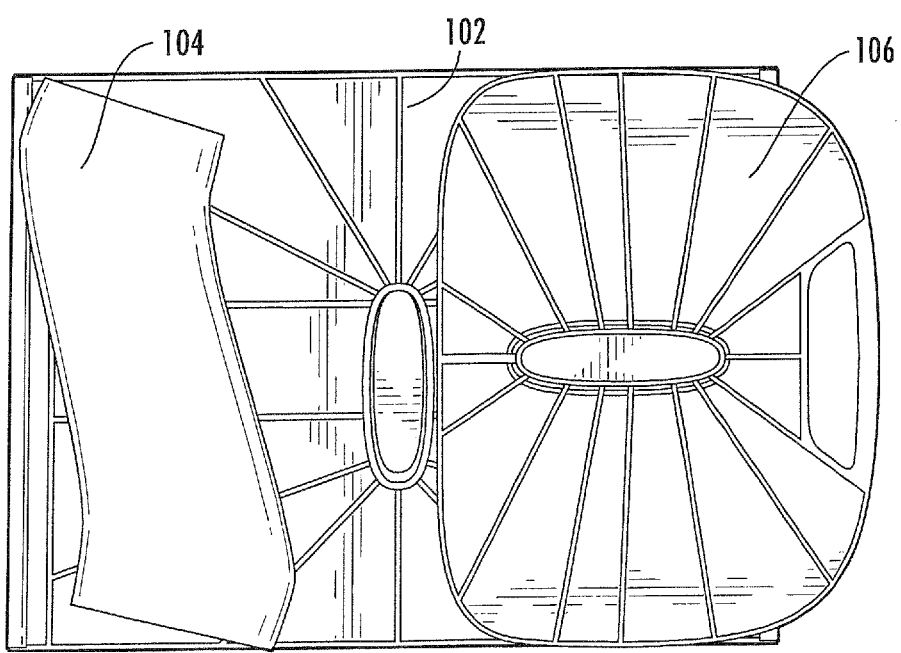

FIGS. 3A-3C illustrate the components assembled in one exemplary stowage configuration. Unlike the utility configuration where the work surface is connected to the stem component (proximal end), and the stem component is connected to the anchor element (distal end), the illustrated stowage configuration is substantially more compact: the work surface is connected to both the stem element and the anchor element.

It is also appreciated that the exemplary embodiments of the workstation apparatus described herein can be made physically collapsible under stress; e.g., when the user's body weight comes in contact with the apparatus, such as during a vehicle or aircraft accident. In this fashion, the user will not experience significant trauma from contact with the components in such instances, since the components will literally fold up (or alternatively) break apart under the force of the user's body contacting it. This functionality can be accomplished using any number of techniques, such as by adjusting the thickness and/or materials of the components in certain critical regions of the apparatus so that they will yield under the desired level of force.

Direct Connection Embodiments

Figure 4A:
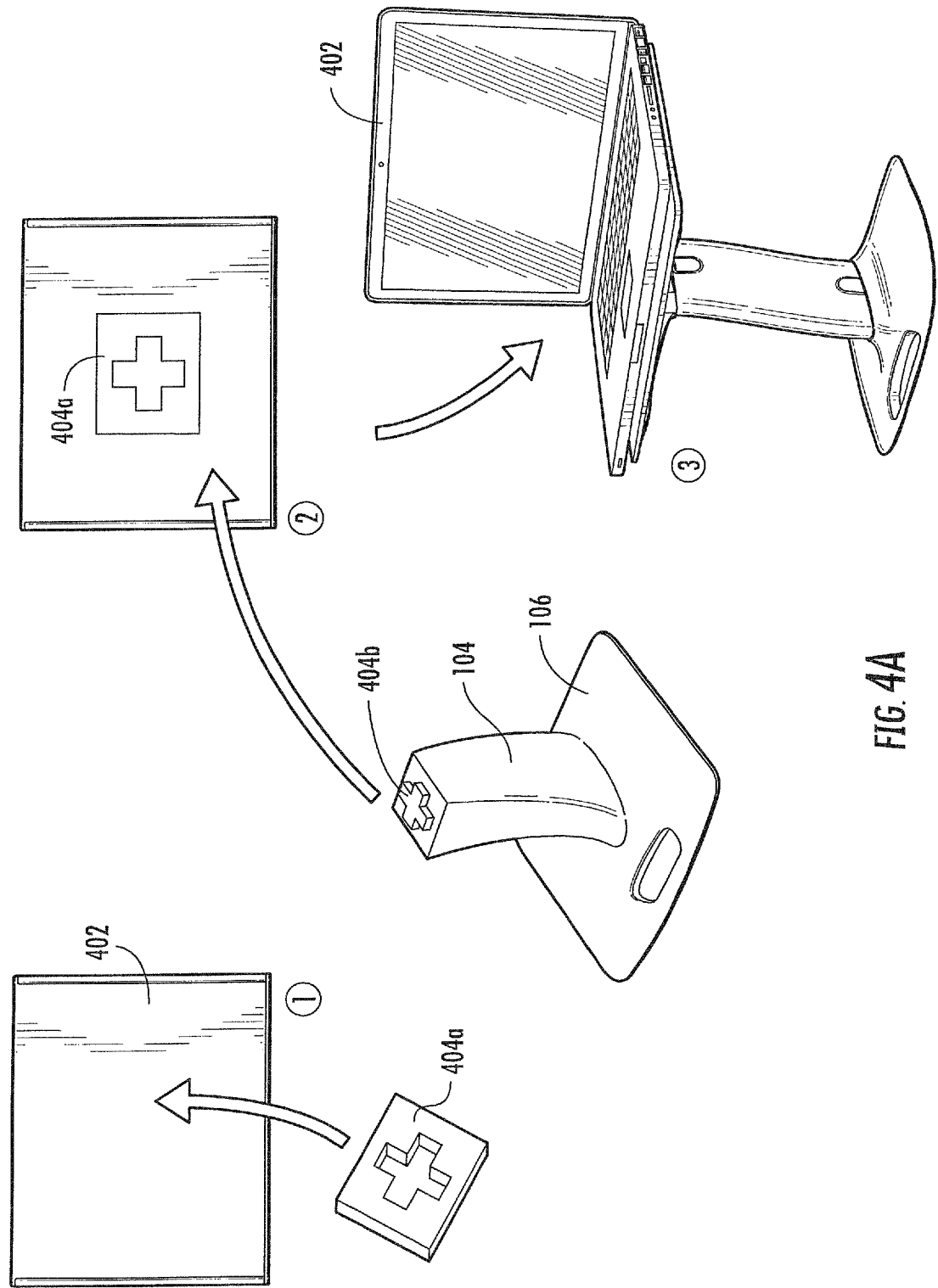
FIGS. 4A and 4B illustrate yet other embodiments of a portable workstation, wherein the work piece or electronic device includes an embedded or attached interface to the portable workstation.

In another embodiment of the invention illustrated in FIGS. 4A and 413, the upper or work surface element 102 can be obviated, and the top of the stem 104 may directly couple to a device or apparatus 402 (e.g., a laptop computer). The attachment between the device/apparatus and the stem 104 may be accomplished in any number of different ways, including without limitation: (i) a specialized male/female releasable attachment mechanism, such as that shown in FIGS. 4A and 4B; (ii) a magnet/metallic plate arrangement, such where the stem 104 contains a magnet, and the device to be mounted has a steel or other plate onto which the magnet can grab (not shown); or any number of other mechanical couplings which would be recognized by those of ordinary skill given the present disclosure.

FIG. 4A illustrates one exemplary embodiment of the direct connection embodiment of the apparatus, and a process by which the portable workstation can be mated to a device. To the degree that the device (e.g., laptop) may not be indigenously equipped with such an interface (as is shown in FIG. 4A), the present invention further contemplates the provision and post-manufacture attachment of a mounting interface 404a on the device 402 (e.g., via an adhesive, Velcro™, threaded fastener, snap-on fit, etc.) so as to permit aftermarket configuration of the device for use with the portable workstation apparatus described herein.

As shown in FIG. 4A, the stem 104 includes a complementary interface 404b which mates with the interface 404a mounted on the device 402. The two, when connected, allow the device 402 to be retained in a stable fashion on the stem 104. The exemplary mechanism shown in FIG. 4A is made selectively releasable (such as via a release catch, button, lever, or the like), so that the user can readily attach and detach the stem and device for stowage, although other approaches may be used.

Figure 4B:
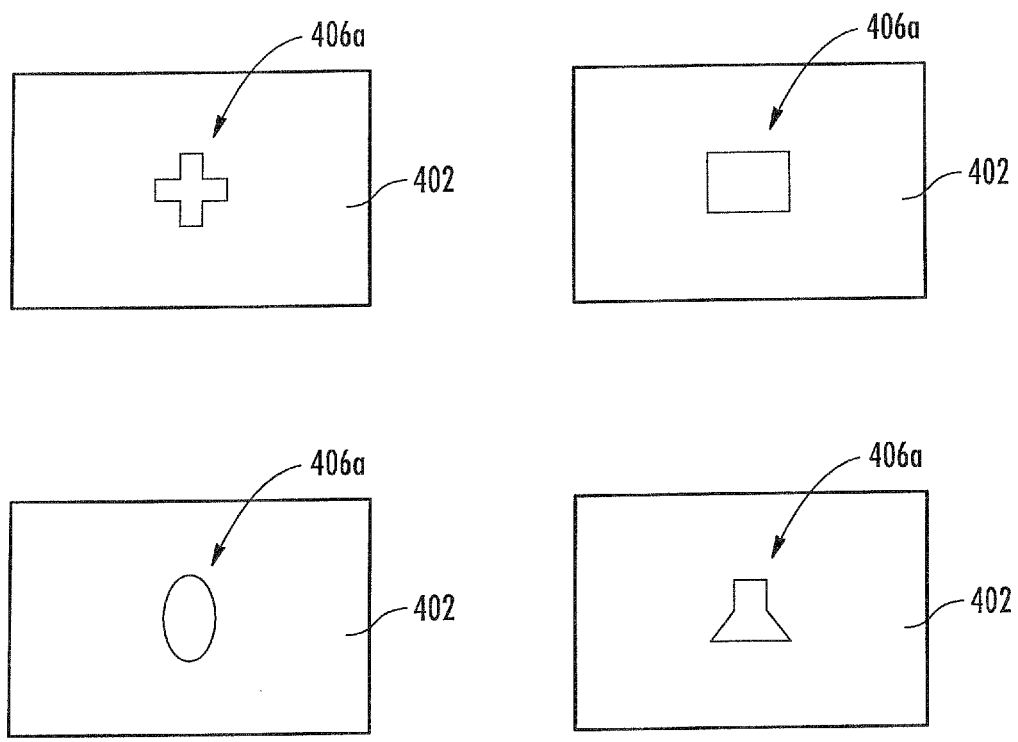

FIG. 4B illustrates additional direct connection embodiments, including (i) a variety of different possible shapes for the insert portion of the mechanism (e.g., oval, cruciform, rectangular, square, trapezoidal, hexagonal, triangular, or combinations of the foregoing), and (ii) a direct connection approach wherein the female portion of the interface 406a is indigenous to the device being mounted (e.g., molded or built into the housing or case of the electronic device itself, such as at time of manufacture). This approach obviates the use of a separate attachment portion 404a as in the embodiment of FIG. 4A, yet also requires the manufacturer of the device to consider and include this feature in its design.

In yet another variant (not shown), a releasable but not-complementary mechanism such as e.g., an adhesive or suction cup may be used to allow the stem 104 to securely grip the electronic device.

In yet a further variant, the stem 104 may comprise a threaded fastener, and the device may simply be "screwed onto" the threaded fastener via a threaded hole in its underside.

The interface (regardless of type) may also be articulated if desired (e.g., via a hinge, universal or ball joint, or other such arrangement), such that once mated, the electronic or other device may rotate, tilt, slide, etc. relative to the support stem 104.

This embodiment has the advantage of lighter weight and more compact form factor.

Near-Field Variants

In another embodiment, the portable apparatus disclosed herein may include apparatus for near-field charging of an electronic device. For example, in one variant, the upper element or work surface 102 includes an embedded or attached substantially planar panel (not shown) which is coupled to an internal or external energy source (e.g., 115 VAC electrical cord). The electronic device disposed on the upper element includes an adapter or other apparatus which allows it to inductively communicate with the panel, such that electrical power can be transferred from the portable apparatus to the electronic device via induction of the type well known in the electromagnetic arts. See, e.g., U.S. Pat. No. 7,791,311 issued Sep. 7, 2010 and entitled "Apparatus and method of wirelessly sharing power by inductive method", which is incorporated herein by reference in its entirety, for one exemplary apparatus and method of performing such inductive (contactless) charging, although it will be appreciated that other techniques may be used as well consistent with the invention.

In this fashion, the user can conveniently charge their electronic device while it is resting in or atop the portable workstation; the user merely need to provide the requisite charging power supply, such as by plugging in a cord to a wall socket or outlet, plugging an external transformer lead into a receptacle on the portable workstation (not shown), parasitically powering the electronic device from another electronic device, or using a battery, solar, or other power supply indigenous to the portable workstation itself.

Use Considerations

The portable workstation of the present invention may be used for any number of different functions, such as (without limitation) a work surface e.g., when the user is traveling and does not have access to a work surface. Common scenarios for use include e.g., in a car, in an airplane, in an airport, on a train or any other location which does not readily have working areas available for a user. If the user is in a sitting position, the user can position the anchor element 106 underneath the user's legs such that a left side of the anchor element is underneath the user's left leg and a right side of the anchor element is underneath the user's right leg, and such that the stem 104 is between the user's legs. The user then has a work surface in which to place any item or device, e.g., a laptop, a book, etc., and/or use as an eating or writing surface if desired.

It can be appreciated that, unlike the fold-out tables at the back of an airplane seat, the portable workstation provides greater space and flexibility to fold out the display screen of the laptop computer. The workspace is not constrained by the form factor limitations of the airplane tray (e.g., an airplane tray must fold into the seat during takeoff and landing, etc.), and hence even with the "slide out feature", is substantially limited in terms of space. Moreover, such prior art airplane seat trays often force the user into a decidedly non-ergonomic posture in order to view their laptop screen and access the keyboard.

Additionally, since prior art airplane seat trays are necessarily coupled to the back of the seat in front of the user, any movement by occupants of that seat will often translate to bouncing or shaking of the tray, thereby potentially disrupting the user. No such coupling exists in the apparatus described herein.

Advantageously, the portable workstation according to embodiments of the invention provides stability and prevents the workstation and/or work surface from sliding forward by the weight of the user. This is in view of that the portable workstation is secured between the user's legs and/or underneath the user's legs. Moreover, the portable workstation removes the weight, heat (e.g., in the case of a laptop computer), and/or electromagnetic radiation (e.g., specific radiation absorption, such as may be experienced through indigenous wireless air interfaces {e/g/. Wi-Fi. Bluetooth, WiMAX} in a computer or other electronic device, or electrical equipment such as disk drives, power supplies, etc.) of an object placed on the work surface away from the user's lap.

Moreover, movement of the electronic device (e.g., laptop computer) off of the user's lap may in certain cases enhance operation of one or more indigenous air interfaces within or associated with the device. For example, many laptops are equipped with: (i) one or more internal antennas (e.g., 2.4 or 5 GHz for Wi-Fi, Bluetooth, etc.), and/or (ii) a wireless dongle (e.g., USB key) or PCMCIA card or other external antenna, the operation of which can be affected adversely by placing it in too close a proximity to other structures, metallic components, or even the human body. Hence, the various embodiments of the present invention advantageously space the electronic device antennas (whether internal or external) from the user's body, and the seat in which they sit, thereby allowing for less antenna signal attenuation by these objects.

Still further, the surfaces of the left and right areas of the anchor element 106 may be contoured to the shape of the user's legs to provide additional comfort; yet other comforts (e.g., cushioning, texturing, massage beads, etc.) may be readily substituted or used in tandem.

The portable workstation also allows the user to move the user's legs once the station is in place. The portable workstation can assemble/disassemble quickly, is lightweight, provides sufficient support for large devices (e.g., a laptop computer), and can easily be stored and/or transported when disassembled.

Moreover, various other embodiments of the invention may comprise other components specialized for particular use scenarios. For example, in one variant, the work surface 102 can be replaced with an infant seating surface. In one such embodiment, the seating surface is additionally equipped with restraining devices, such as a seat belt, and/or chest harness. In one such variant, the infant seating may be additionally harnessed to the user's body so as to afford further rigidity and security. The seating surface may also be "dimpled" and/or coated with a frictional or no-skid coating, so as to aid in retaining the child in place while sitting, and avoiding them from sliding off to one side or front/back.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Support apparatus, comprising:
a substantially planar base element;
a substantially planar upper element;
a support element coupled to the base element and said upper element;
where said base element and said upper element can be coupled to said support element in a plurality of different configurations so that said support apparatus is optimized for respective ones of a plurality of use applications;
where said base element is configured to receive the support element in a substantially central portion of the base element so that said support element can be received between two legs of a human being, and said base element will simultaneously engage bottoms of the legs so as to stabilize the support apparatus;
where said plurality of different configurations comprise (i) a first discrete rigid configuration where an area of the upper element is substantially aligned with an area of the base element; and (ii) a second discrete rigid configuration where the area of the upper element is at least partly offset from the area of the base element; and where the upper element is further configured to connect to the base element and the support element in a substantially compact manner for storage.

2. The support apparatus of claim 1, wherein said upper, base and support elements are each fashioned at least partly from plastic, and said upper and base elements are each configured to mate with said support element in at least two different orientations.

3. The support apparatus of claim 1, wherein said a plurality of different configurations comprise (i) said upper element being substantially parallel to said base, and (ii) said upper element being angled with respect to said base.

4. The support apparatus of claim 1, wherein said upper, base and support elements are each fashioned at least partly from plastic, and can be disassembled and placed in a disposition which allows the support apparatus to be substantially received in a single item of personal luggage.

5. A method of configuring a support apparatus having top, support and base elements which may be assembled in a plurality of different configurations, the method comprising:
identifying a desired use case from at least a first desktop use case and a second podium use case;
where each one of the plurality of different configurations consists of a unique fixed permutation of two possible centers of gravity and two possible angles of incline;
assembling said top element to said support element in one of a plurality of possible discrete orientations thereof so as to be compatible with said use case; and
assembling said support element to said base element in one of a plurality of possible discrete orientations thereof so as to be compatible with said use case.

6. The method of claim 5, wherein:
when said desired use case is for the first desktop use case:
said top element and said base element are each substantially planar; and
said ones of a plurality of possible discrete orientations cooperate so as to place planes of said top element and said base element in a substantially parallel orientation with one another, yet with said top element offset in area from said base element.

7. The method of claim 5, wherein:
when said desired use case is for the second podium use case:
said ones of a plurality of possible orientations cooperate so as to permit the support apparatus to stand on its own on a flat surface under the weight of an object placed atop said top element.

8. Reconfigurable portable workstation apparatus having a plurality of different assembled configurations, comprising:
a base element having a first interface surface comprising a first angle fixed relative to a base surface;
an upper element having a second interface surface comprising a second angle fixed relative to an upper surface; and
a support element operative to be coupled to said base element via the first interface surface in only a first orientation and a second reversed orientation, and to said upper element via the second interface surface in only a third orientation and a fourth reversed orientation, said first, second reversed, third, and fourth reversed orientations and said first and second angles cooperating to produce said plurality of different assembled configurations.

9. The apparatus of claim 8, wherein said first and second angles are not equal.

10. A portable workstation, comprising:
a work surface, the work surface approximately rectangular;
an anchor plate, the anchor plate approximately rectangular, the anchor plate having at least two contoured areas on an upper surface;
a stem configured to connect to the anchor plate at a proximal end and configured to connect to the work surface at a distal end;
where the stem is further configured to provide a plurality of different rigid configurations that are not adjustable and are characterized by different angular relationships and offsets; and
where the work surface is further configured to connect to the anchor plate and the stem in a substantially compact manner for storage.

11. The portable workstation of claim 10, wherein the stem connects to the work surface midway between a left edge of the work surface and a right edge of the work surface.

12. The portable workstation of claim 11, wherein the stem connects to the anchor plate midway between a left edge of the anchor plate and a right edge of the anchor plate.

13. The portable workstation of claim 12, wherein the stem connects near a front edge of the work surface and connects near a back edge of the anchor plate.

14. The portable workstation of claim 10, wherein the anchor plate is smaller than the work surface.

15. The portable workstation of claim 10, wherein a locking mechanism secures the proximal end of the stem to the anchor plate when assembled.

16. The portable workstation of claim 10, wherein a locking mechanism secures the distal end of the stem to the work surface when assembled.

17. The portable workstation of claim 10, wherein a space between the work surface and anchor plate is sized to fit a user's legs therebetween.

18. The portable workstation of claim 10, wherein the stem is sized to fit between a user's legs while the anchor plate rests on a sitting surface.

* * * * *